(12) United States Patent
Koester

(10) Patent No.: US 8,857,144 B2
(45) Date of Patent: Oct. 14, 2014

(54) RETRACTING GUARD FOR A CUTTER

(71) Applicant: Paladin Brands Group, Inc., Cedar Rapids, IA (US)

(72) Inventor: Jay Koester, Manchester, IA (US)

(73) Assignee: Paladin Brands Group, Inc., Oak Brook, IL (US)

( * ) Notice: Subject to any disclaimer, the term of this patent is extended or adjusted under 35 U.S.C. 154(b) by 205 days.

(21) Appl. No.: 13/633,293

(22) Filed: Oct. 2, 2012

(65) Prior Publication Data

US 2013/0081370 A1 Apr. 4, 2013

Related U.S. Application Data

(60) Provisional application No. 61/542,490, filed on Oct. 3, 2011.

(51) Int. Cl.
| | |
|---|---|
| *A01D 34/73* | (2006.01) |
| *A01D 34/84* | (2006.01) |
| *A01D 34/82* | (2006.01) |
| *A01D 34/81* | (2006.01) |
| *A01D 75/20* | (2006.01) |

(52) U.S. Cl.
CPC .............. *A01D 34/81* (2013.01); *A01D 34/84* (2013.01); *A01D 34/828* (2013.01); *A01D 75/20* (2013.01)
USPC .......................................................... 56/255

(58) Field of Classification Search
USPC ...................................... 56/255, 320.1, 320.2
See application file for complete search history.

(56) References Cited

U.S. PATENT DOCUMENTS

| | | | | |
|---|---|---|---|---|
| 3,226,920 A | * | 1/1966 | Gilbertson | 56/255 |
| 3,369,350 A | * | 2/1968 | Rogers et al. | 56/11.9 |
| 3,496,707 A | * | 2/1970 | Kobey | 56/17.5 |
| 4,282,704 A | * | 8/1981 | Stevens | 56/320.1 |
| 4,378,668 A | * | 4/1983 | Gullett | 56/12.7 |
| 4,738,091 A | * | 4/1988 | Kulak et al. | 56/320.2 |
| 4,907,400 A | * | 3/1990 | Roden | 56/10.4 |
| 5,657,620 A | * | 8/1997 | Thagard et al. | 56/15.2 |
| 5,765,348 A | * | 6/1998 | Thagard et al. | 56/15.2 |
| 6,321,518 B1 | * | 11/2001 | O'Hagan | 56/294 |
| 7,313,902 B1 | * | 1/2008 | Eavenson et al. | 56/13.6 |
| 7,340,877 B2 | | 3/2008 | Anderson | |
| 7,743,595 B2 | | 6/2010 | Savoie | |
| 2007/0193243 A1 | * | 8/2007 | Schmidt et al. | 56/181 |

OTHER PUBLICATIONS

International Search Report, PCT/US2012/000445, Nov. 30, 2012, Applicant J. Koester, United States.

\* cited by examiner

*Primary Examiner* — Thomas B Will
*Assistant Examiner* — Mai Nguyen
(74) *Attorney, Agent, or Firm* — Ryan N. Carter

(57) ABSTRACT

An improved blade guard for a land clearing device such as a lawn mower or brush cutter. The land clearing device generally comprises a blade assembly having a plurality of spinning cutters covered by a housing. A guard having a closed position and an open position is pivotally combined with the front of the housing. In its closed position, the guard covers a portion of the blade assembly. In its open position a portion of the blade assembly is exposed to allow the cutters to perform land clearing operations. The guard is pivoted from its closed position to its open position using a linkage assembly which moves the guard to its open position when the front of the guard is pushed against a solid object. The guard falls back to its closed position when force is no longer present between it and the solid object.

17 Claims, 6 Drawing Sheets

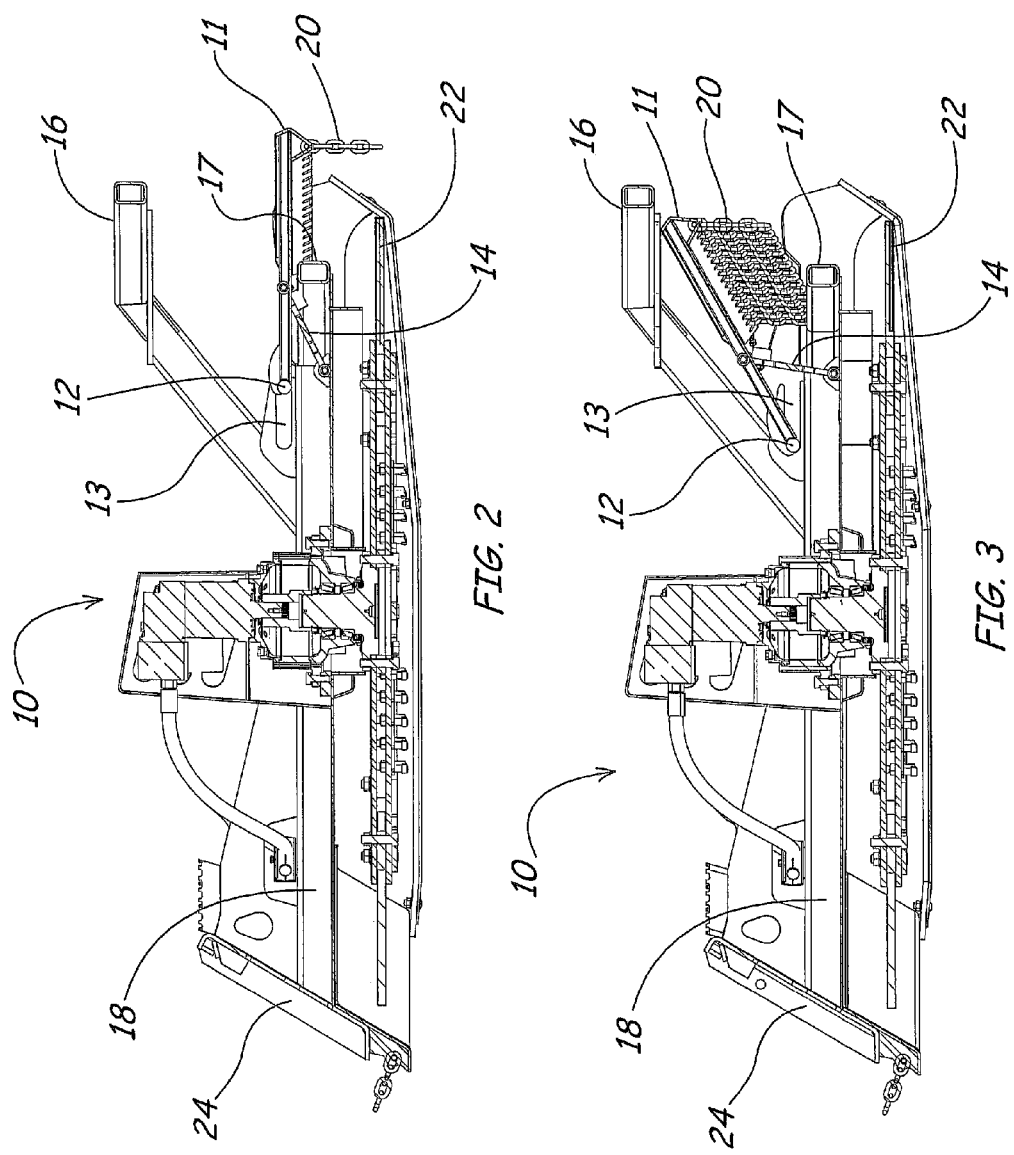

RETRACTING GUARD FOR A CUTTER

This application is based upon U.S. Provisional Application Ser. No. 61/542,490 filed Oct. 3, 2011, the complete disclosure of which is hereby expressly incorporated by this reference.

BACKGROUND

Mowing, felling, and mulching operations are often performed with land clearing devices such as brush cutters or lawn mowers. Land clearing devices may be standalone units or they may be attachments adapted to combine with tractors, skid-steers, or other suitable machines. Land clearing devices typically include one or more rotating blades adapted to cut grass, shrubs, small trees, and other types of brush. The blades may be powered by any suitable means, including gasoline and hydraulic engines. Land clearing devices typically have paneling over the top surface of the blades to help prevent injuries that may be caused by the spinning blades. Some land clearing devices have guards adapted to move from a closed position to an open position which exposes the blade during certain cutting operations. Existing movable guards require the operator to raise the land clearing device off of the ground then lower the device vertically against a tree or other object in order to open the guard and expose the blades. This and other drawbacks in the prior art are overcome by the present invention described below.

SUMMARY

The present invention includes an improved blade guard for a land clearing device such as a lawn mower or brush cutter. The land clearing device generally comprises a blade assembly having a plurality of spinning cutters combined therewith and is covered by a housing. A guard is pivotally combined with the front of the housing (where "front" is defined relative to the direction of normal forward travel of the land clearing device) so that it has a closed position and an open position. In its closed position, the guard shields a portion of the blade assembly. In its open position a portion of the blade assembly is exposed to allow the cutters to perform land clearing operations. The guard is pivoted from its closed position to its open position using a linkage assembly which moves the guard to its open position when the front of the guard is pushed generally horizontally (i.e. generally in the direction of the land clearing device's forward travel) against an object such as a tree. The guard falls back to its closed position when force is no longer present between the guard and the object. The present invention is beneficial because it uses force produced from the forward travel of the land clearing device to open the guard in a vertical direction. The invention maximizes blade utilization by moving the guard to allow the cutters to perform land clearing operations and optimizes debris deflection by creating a pocket within which debris cannot be projected toward the operator.

BRIEF DESCRIPTION OF THE DRAWINGS

FIG. 2 is a side section view taken along lines A-A of FIG. 1 showing the land clearing device with the guard in the closed position;

FIG. 3 is a side section view taken along lines A-A of FIG. 1 showing the land clearing device with the guard in the open position;

DETAILED DESCRIPTION

Figure 1:
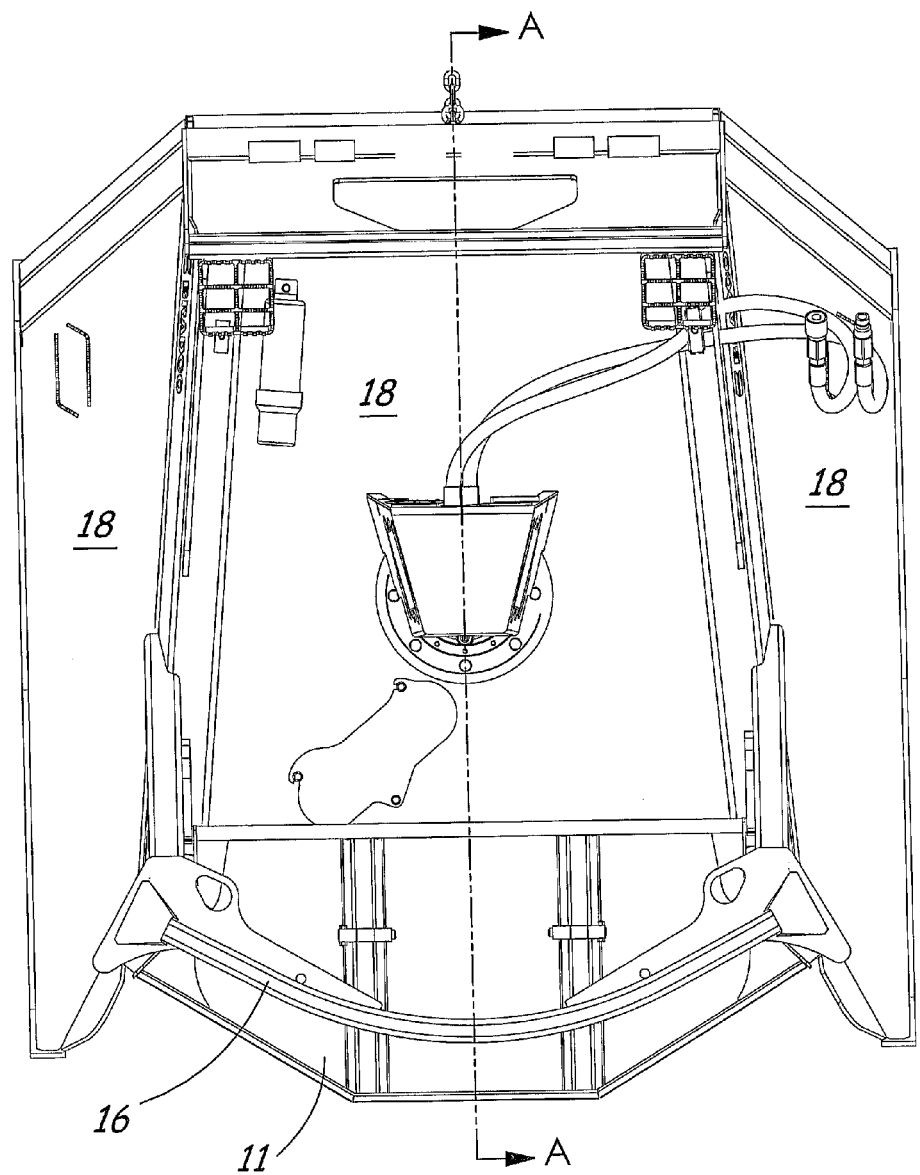
FIG. 1 is a top view of the land clearing device.
Figure 4:
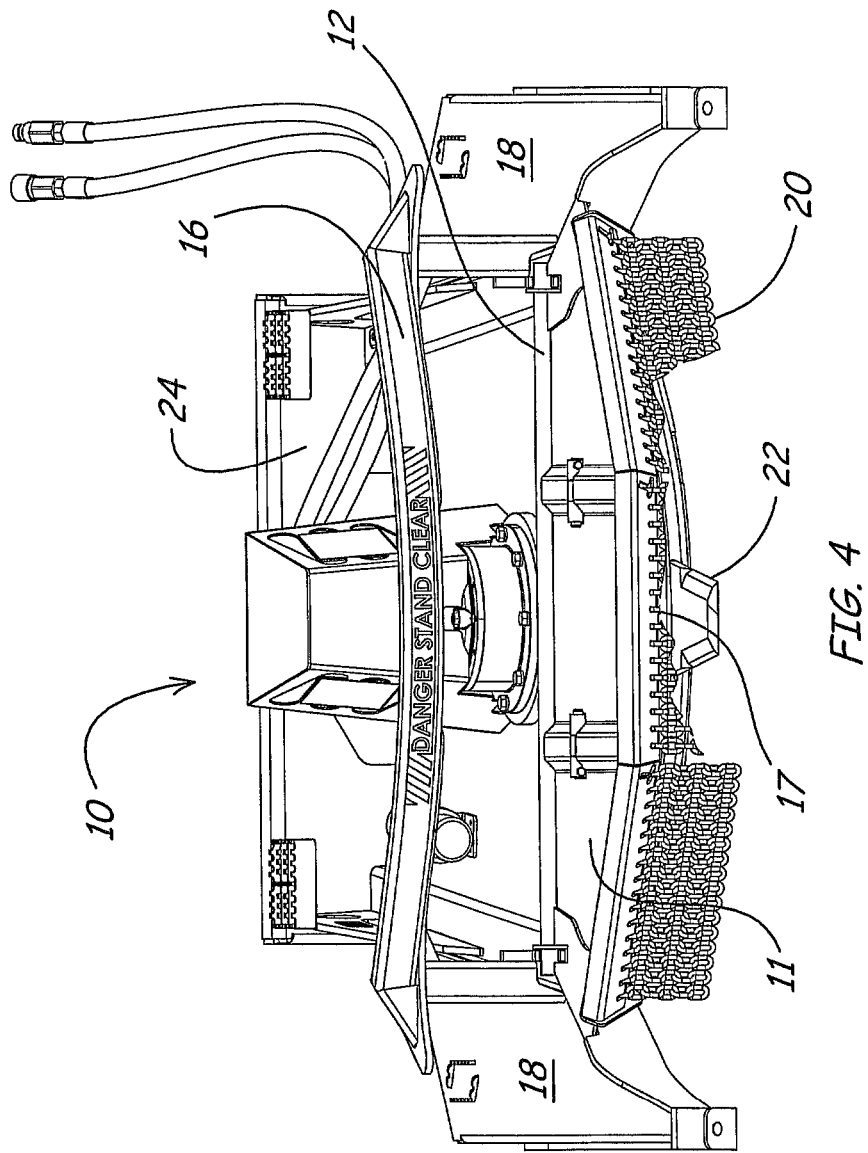
FIG. 4 is a front view of the land clearing device showing the guard in its closed position with chains cut away to show the cutters.
Figure 5:
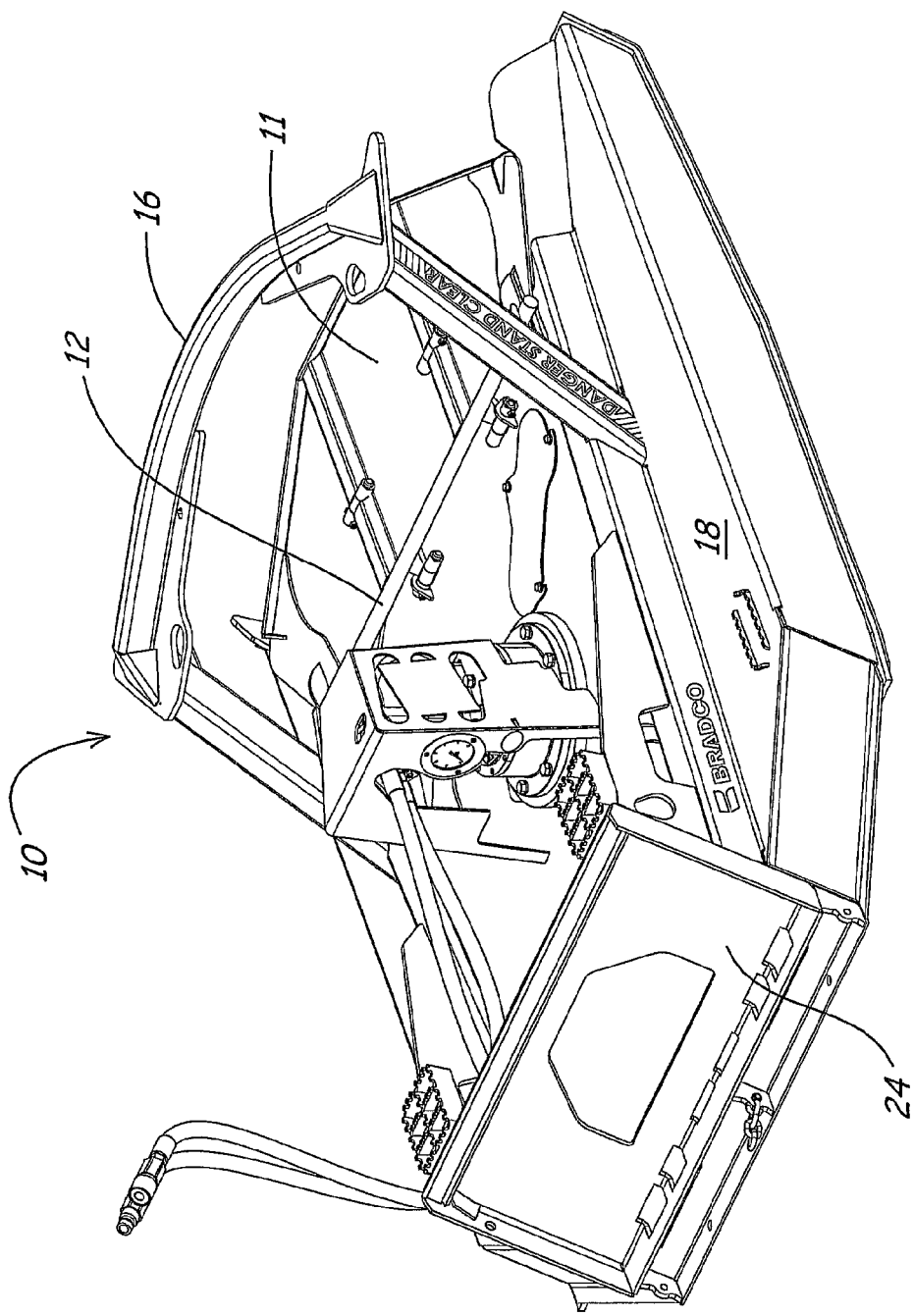
FIG. 5 is a rear perspective view of the land clearing device.

The present invention includes an improved blade guard 11 for a land clearing device 10 such as a lawn mower or brush cutter. As shown in FIGS. 2, 3, 4, and 6, the land clearing device 10 generally comprises a blade assembly having a plurality of spinning teeth, cutting chains, knives, blades or other type of cutters 22 covered by a housing 18. A guard 11 is pivotally combined with the front of the housing 18 (where "front" is defined relative to the direction of normal forward travel of the land clearing device). The guard 11 has a closed position (FIG. 2) and an open position (FIGS. 3, 4, 6, and 7). In its closed position, the guard 11 shields a portion of the blade assembly. In its open position a portion of the blade assembly is exposed to allow the cutters 22 to perform land clearing operations while continuing to provide shielding to the operator. The land clearing device 10 shown is adapted to combine with a skid-steer or other similar work vehicle via attachment connecting means 24 (FIG. 5).

Figure 7:
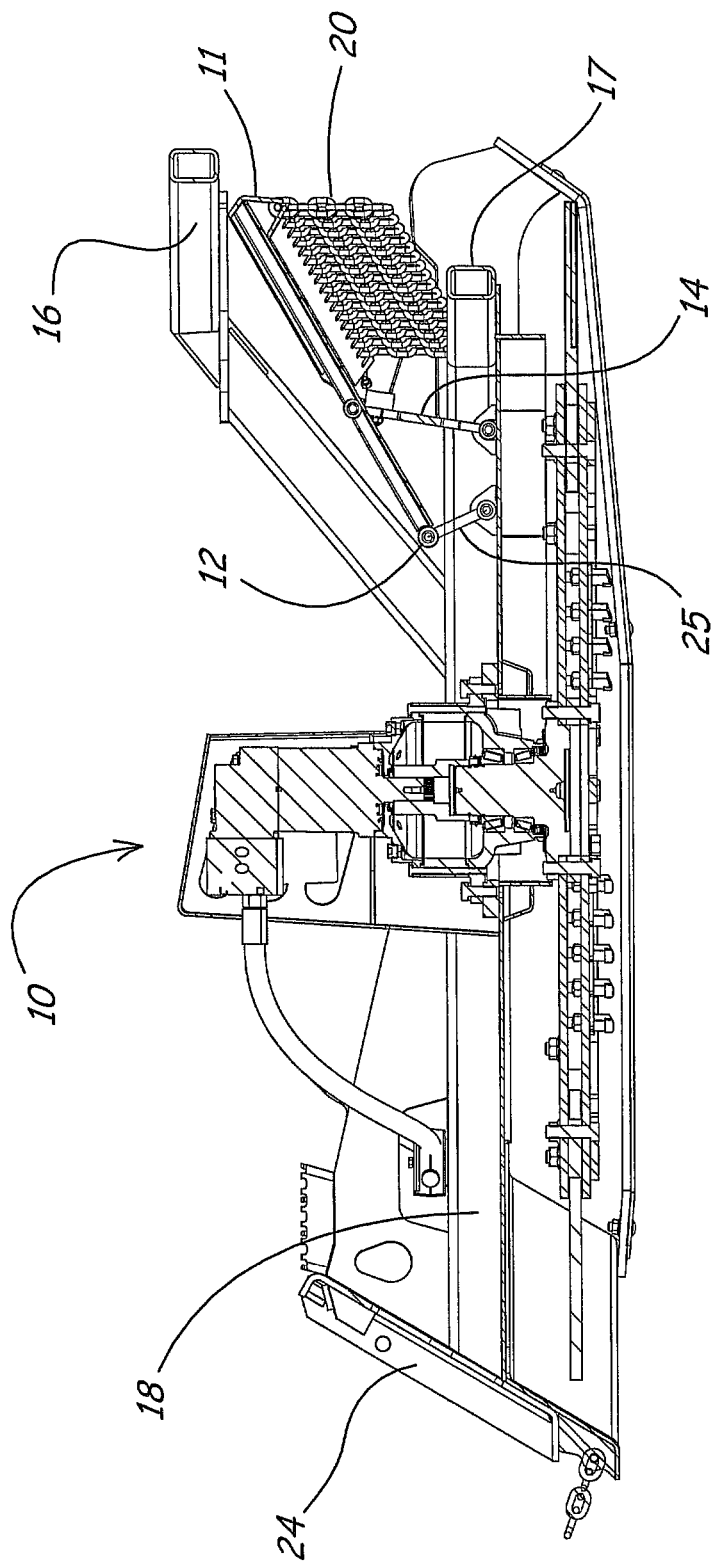
FIG. 7 is a side section view taken along lines A-A of FIG. 1 showing an alternate linkage assembly.

As shown by comparing FIGS. 2, 3, and 7 the guard 11 is pivoted between its closed position and its open position using a linkage assembly. The linkage assembly uses energy created from the forward motion of the land clearing device 10 (i.e. motion that is generally parallel with the direction of travel of the vehicle) to pivot the guard 11 to its open position by pushing the guard 11 against a solid object such as a tree, stump, or brush.

In the embodiments shown in FIGS. 2 and 3, the linkage assembly includes a pivot member 12, a slot or opening (hereinafter "slot 13"), and a hinge or pivot link (hereinafter "pivot link 14"). The pivot member 12 is combined with the guard 11 near its rear end and may actually be part of the guard 11 instead of a separate component. The pivot link 14 has a first end pivotally combined with the guard 11 and a second end pivotally combined with the housing 18. In one embodiment the first end of the pivot link 14 is combined with the guard 11 between the guard 11 forward end and the guard rear end. The pivot link 14 first end creates a first axis of rotation for the guard 11 and the pivot member 12 creates a second axis of rotation for the guard 11.

As shown in FIG. 2, the ends of the pivot link 14 are offset such that the pivot link 14 first end is combined with the guard 11 above and in front of the pivot link 14 second end. This allows the pivot link 14 to be angled upward when the guard 11 is in its closed position. The upward angle of the pivot link 14 allows the pivot link 14 first end to carry the guard 11 through an arc as the pivot link 14 second end remains stationary (as the vertex of the arc). It will be recognized that the greater the starting angle of the pivot link 14 (relative to horizontal), the less force is required to move the pivot link 14 through the arc. FIG. 3 shows the guard 11 in its open position wherein the pivot link 14 has traveled through the entire arc and stopped short of being perpendicular to horizontal.

Figure 6:
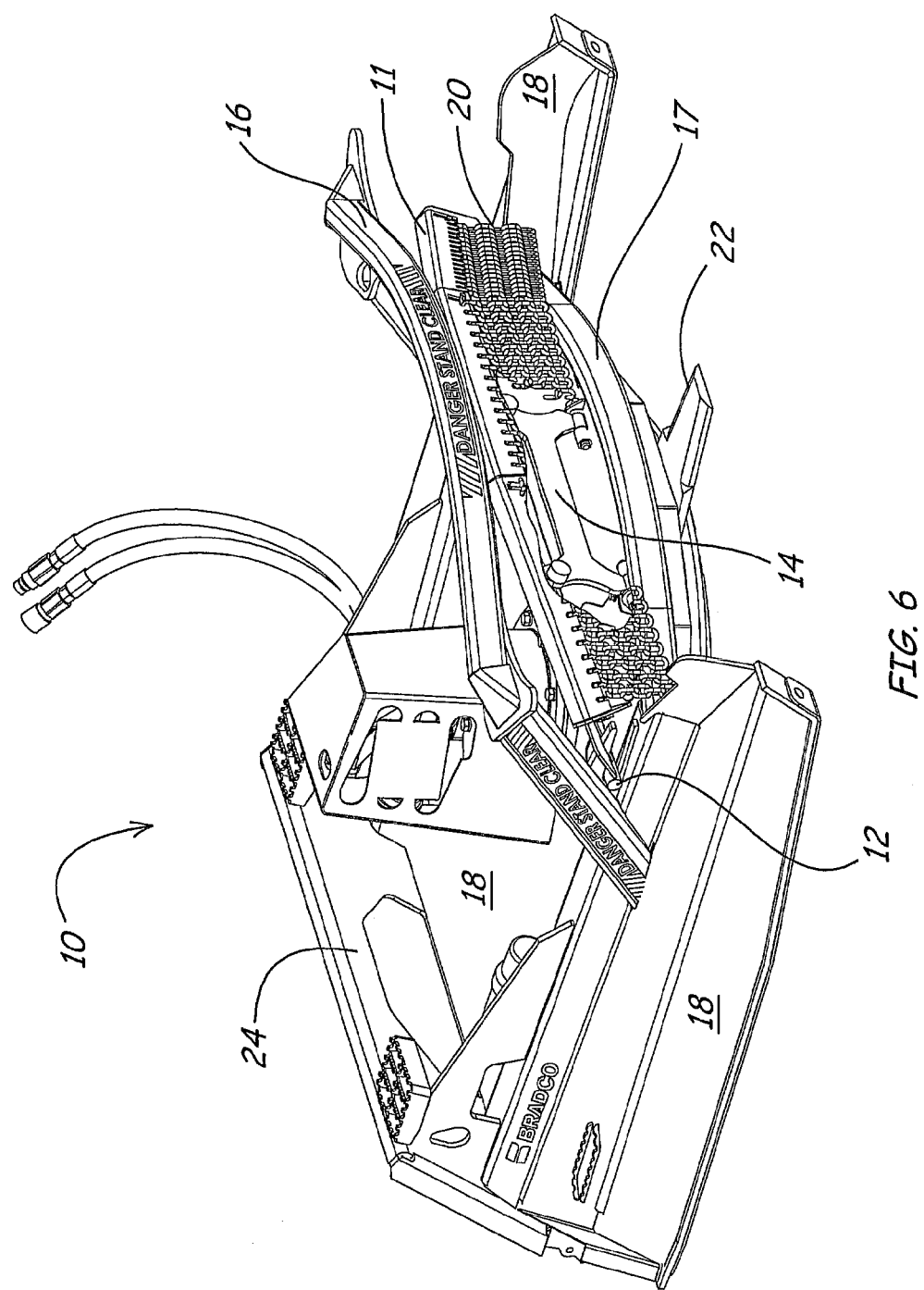
FIG. 6 is a front perspective view of the land clearing device showing the guard in its open position.

In the embodiment shown in FIGS. 2, 3, and 6, the pivot member 12 travels generally laterally/rearward in the slot 13 as the guard 11 is pushed against the object. In addition to allowing lateral movement of the pivot member 12, the slot 13 also serves to keep the pivot member 12/rear end of the guard 11 down as the front end of the guard 11 lifts up. In this embodiment it is important that the rear end of the guard 11 is not allowed to rise higher than the front end of the guard 11 so that the guard 11 maintains a forward reaching angle which helps deflect debris away from the operator.

As the pivot member 12 travels backwards in the slot 13, the pivot link 14 forces the guard 11 to pivot upward since the pivot link 14 has a fixed length and is pivotally connected to the guard 11 at its first end end and the housing 18 on its second end. In other words, because the pivot link 14 has a fixed length and is combined with the movable guard 11 on one end and the stationary housing 18 on its other end, the only way for the guard 11 to travel backward in the slot 13 is for the guard 11 to raise upward thereby allowing the first end of the pivot link 14 to move through an arc (upward and backward) relative to the second end of the pivot link 14. In this manner, the guard 11 is moved to its open position by traveling backward and pivoting upward/backward as the guard 11 is pushed against an object. Gravity biases the guard 11 in its closed position so that when force is removed from the guard 11, the guard 11 pivots downward/forward to its closed position thereby forcing the pivot member 12 to travel forward in the slot 13.

In some embodiments, the guard's 11 pivoting motion is limited by the length of the slot 13. As shown in FIG. 3, for example, when the pivot member 12 reaches the back of the slot 13, the guard 11 is fully open since the guard 11 cannot travel farther backward in the slot 13. In other embodiments, the pivot link 14 serves as the feature that limits the travel distance of the guard 11 since the pivot link 14 has a fixed length that prevents the guard 11 from opening further when the pivot link 14 is fully extended. Preferably, the pivot link 14 is angled forward when the guard 11 is fully open regardless of the mechanism that determines the fully open position of the guard 11. This is shown in FIGS. 3 and 7 wherein the pivot link 14 is angled slightly forward to allow gravity to move the guard 11 to its closed position when force is removed. In other words, if the ending position of the pivot link's 14 arc were to be vertical or past ninety degrees, then the pivot link 14 may hold the guard 11 open even after force was removed from it absent some biasing force.

In addition to the linkage assemblies shown in FIGS. 2 and 3 and described above, the invention includes other linkage assemblies in which the guard 11 is pivoted upward to its open position by forcing the guard 11 against a solid object in a generally horizontal direction. For example, FIG. 7 shows an alternate linkage assembly which includes a pivot link 14 and a second pivot link 25. The pivot link 14 serves the same function as described above and is combined with the guard 11 forward of the second pivot link 25. The second pivot link 25 serves a function similar to the pivot member 12/slot 13 features described above in that it allows the rear end of the guard 11 to travel backwards while keeping the rear end of the guard 11 lower than the front end of the guard 11. In this alternate embodiment, a first end of the second pivot link 25 is pivotally combined with the rear end of the guard 11 at approximately the position of the pivot member 12. A second end of the second pivot link 25 is pivotally combined with a portion of the housing 18. The pivot link 14 first end creates a first axis of rotation for the guard 11 and the second pivot link 25 first end creates a second axis of rotation for the guard 11.

The second pivot link 25 may be the same length as pivot link 14, or it may be longer or shorter than pivot link 14. The pivot link 14 should be capable of raising the guard 11 higher above the guard 11 than the second pivot link 25 which generally means that the pivot link 14 should be longer than second pivot link 25 if the two pivot links 14, 25 are combined with the housing 18 at the same elevation. Put another way, the pivot link 14 extends higher above the housing 18 when the guard 11 is in its open position so that the front of the guard 11 angles forward/upward to deflect debris away from the operator. The two pivot links 14, 25 work together to pivot the guard 11 to its open position as it is pushed against a solid object. The second pivot link 25 allows the guard 11 to travel backward relative to the housing 18 by carrying the rear portion of the guard 11 through a first arc as the guard 11 is pushed against an object. The force simultaneously causes pivot link 14 to carry the guard 11 upward/rearward relative to the second end of the pivot link 14. In one embodiment, the angle of the first arc begins at about sixty degrees and ends at about one hundred twenty degrees while the angle of the second art begins at about ten degrees and ends at about eighty degrees.

As shown in FIG. 6, a debris deflector 20 such as a chain, cable, or rope may be used to help prevent debris from being projected out of the cutting area. The debris deflector 20 may be attached to the guard 11 at one end and a portion of the housing 18 at its other end. The debris deflector 20 has a predetermined length that allows it to travel with the guard 11. A plurality of debris deflectors 20 may be used across the entire front portion of the guard 11.

Some embodiments of the present invention include additional features which aid in land clearing operations. In some embodiments, the land clearing device 10 comprises a push bar 16 which is firmly combined with the housing 18 and adapted to push over smaller brush and trees. An example of the combination between the push bar 16 and the housing 18 is shown in FIG. 5. As shown in the embodiment of FIG. 2, the push bar 16 is located behind the guard 11 when the guard 11 is in its closed position to allow the front of the guard 11 to push against the brush or tree and move to its open position before the push bar 16 contacts these objects. This allows the guard 11 to be open and expose the cutters 22 before the push bar 16 begins knocking down the brush or trees. Other embodiments include a member 17 combined below the guard 11 and above the cutters 22. This member 17 serves to protect the cutter assembly from hitting objects that the cutters 22 cannot cut through. As shown in FIGS. 2, 3, and 6, the cutters 22 extend outward past the member 17 during normal operation, however, as known in the art, the cutters 22 may be pivotally combined with the cutter assembly thereby making them able to pivot out of the way in the event they strike rocks or other impenetrable objects.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:
1. A land clearing device capable of traveling in a forward direction having a front portion and a rear portion, said land clearing device comprising:
 a housing;
 a blade assembly rotationally combined with the housing, said blade assembly having multiple cutters; and
 a guard operatively combined with the housing by a linkage assembly, said guard having a first end, a second end, an open position in which the cutters are exposed for cutting operations, and a closed position in which the cutters are shielded;

wherein said linkage assembly pivots the guard upward from its closed position to its open position using two offset axis of rotation when the guard is pushed against an object in a direction that is generally parallel to the forward direction of travel of the land clearing device;

wherein the linkage assembly further comprises a pivot member combined with the guard second end;

wherein the linkage assembly further comprises a slot having a first end and a second end, wherein said slot is adapted to receive the pivot member and allow the pivot member to travel therein between the slot first end and the slot second end.

2. The land clearing device of claim 1 wherein the linkage assembly operates to move the guard toward the rear portion of the land clearing device as the guard is pivoted to its open position.

3. The land clearing device of claim 1 wherein the linkage assembly further comprises a pivot link having a first end pivotally combined with the guard and a second end pivotally combined with the housing.

4. The land clearing device of claim 3 wherein the first and second ends of the pivot link are offset such that the pivot link first end is combined with the guard above and in front of the pivot link second end when the guard is in its closed position.

5. The land clearing device of claim 1 wherein the guard moves from its open position to its closed position when force is removed from the guard first end.

6. The land clearing device of claim 1 further comprising a push bar combined with the housing for knocking over small trees and brush.

7. The land clearing device of claim 1 wherein the object is a tree.

8. The land clearing device of claim 1 further comprising a debris deflector having a first end combined with the guard and a second end combined with the housing.

9. A land clearing device having a front portion and a rear portion, said land clearing device comprising:
- a housing;
- a blade assembly rotationally combined with the housing, said blade assembly having multiple cutters; and
- a guard operatively combined with the housing by a linkage assembly, said guard having a first end, a second end, an open position in which the cutters are exposed for cutting operations, and a closed position in which the cutters are shielded;
- wherein said linkage assembly has a pivot link with a first end pivotally combined with the guard and a second end pivotally combined with the housing such that the first end of the pivot link is offset from the second end of the pivot link to allow the pivot link to carry the guard through an arc to the guard's open position as the guard is pushed against an object;
- wherein the linkage assembly further comprises a pivot member combined with the guard second end and a slot having a first end and a second end, wherein said slot is adapted to receive the pivot member and allow the pivot member to travel therein between the slot first end and the slot second end.

10. The land clearing device of claim 9 wherein the offset is defined by the pivot link first end being combined with the guard above and in front of the pivot link second end.

11. The land clearing device of claim 9 wherein the guard moves from its open position to its closed position when force is removed from the guard.

12. The land clearing device of claim 9 further comprising a push bar combined with the housing for knocking over small trees and brush.

13. The land clearing device of claim 9 wherein the object is a tree.

14. A land clearing device having a front portion and a rear portion, said land clearing device comprising:
- a housing;
- a blade assembly rotationally combined with the housing, said blade assembly having multiple cutters; and
- a guard operatively combined with the housing by a linkage assembly, said guard having an open position wherein the cutters are exposed for cutting operations and a closed position wherein the cutters are shielded;
- wherein the linkage assembly comprises a pivot member combined with the guard, a slot in the housing having a first end and a second end, and a pivot link having a first end pivotally combined with the guard and a second end pivotally combined with the housing;
- wherein said slot is adapted to receive the pivot member and allow the pivot member to travel therein between the slot first end and the slot second end, and;
- wherein the guard moves to its open position when it is pushed against an object by forcing the pivot member from the slot first end to the slot second end as the pivot link pivots the guard upward.

15. The land clearing device of claim 14 wherein the guard moves from its open position to its closed position when force is removed from the guard.

16. The land clearing device of claim 14 further comprising a push bar combined with the housing for knocking over small trees and brush.

17. The land clearing device of claim 14 wherein the object is a tree.

* * * * *